United States Patent
Varma et al.

(10) Patent No.: US 9,780,836 B2
(45) Date of Patent: Oct. 3, 2017

(54) SERVER INFORMATION HANDLING SYSTEM NFC MANAGEMENT SIDEBAND FEEDBACK

(71) Applicant: Dell Products L.P., Round Rock, TX (US)

(72) Inventors: Yogesh Varma, Round Rock, TX (US); Syed S. Ahmed, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 14/467,525

(22) Filed: Aug. 25, 2014

(65) Prior Publication Data

US 2015/0311952 A1    Oct. 29, 2015

Related U.S. Application Data

(63) Continuation-in-part of application No. 14/294,479, filed on Jun. 3, 2014, which is a continuation-in-part of application No. 14/259,574, filed on Apr. 23, 2014.

(51) Int. Cl.
| | |
|---|---|
| *H04B 7/00* | (2006.01) |
| *H04W 24/00* | (2009.01) |
| *H04B 5/00* | (2006.01) |
| *H04L 12/24* | (2006.01) |

(52) U.S. Cl.
CPC ......... *H04B 5/0031* (2013.01); *H04L 41/069* (2013.01)

(58) Field of Classification Search
CPC ....... H04W 8/00; H04W 24/00; H04W 24/04; H04W 84/18; G06K 19/0723; H04B 5/0031

USPC .................. 455/41.1–41.3, 423–425
See application file for complete search history.

(56) References Cited

U.S. PATENT DOCUMENTS

| | | |
|---|---|---|
| 4,270,168 A | 5/1981 | Murphy et al. |
| 6,701,460 B1 | 3/2004 | Suwandi et al. |
| 7,225,239 B2 | 5/2007 | King et al. |
| 7,321,312 B1 | 1/2008 | Garnett |
| 7,516,025 B1 | 4/2009 | Williams et al. |
| 7,561,875 B1 * | 7/2009 | Eberle ................ G06F 11/2294 455/41.2 |
| 7,890,677 B2 | 2/2011 | Chandrasekhar et al. |

(Continued)

*Primary Examiner* — Simon Nguyen
(74) *Attorney, Agent, or Firm* — Terrile, Cannatti, Chambers & Holland, LLP; Robert W. Holland

(57) ABSTRACT

Server information handling system deployment and maintenance is enhanced with automated trouble ticket generation at a mobile telephone through an NFC transaction with a management controller. NFC transactions coordinate authorization for replacement component installation and server information handling system replacement. In one embodiment, a bezel includes an NFC device that interfaces with a management controller and stores configuration information to aid installation of replacement server information handling systems in the event of a system failure. A back-up battery provides power to an NFC support circuit that stores fault codes detected by the management controller so that fault codes are available during management controller failures. In one embodiment, contact information provided from a mobile telephone through an NFC transaction is used by the management controller to notify the mobile telephone of the state of management functions initiated by the mobile telephone with the NFC transaction.

20 Claims, 7 Drawing Sheets

(56) References Cited

U.S. PATENT DOCUMENTS

| | | |
|---|---|---|
| 7,934,054 B1 | 4/2011 | Moll et al. |
| 8,116,759 B2 | 2/2012 | Ying |
| 8,321,922 B1 | 11/2012 | Lo et al. |
| 9,055,120 B1 | 6/2015 | Firman |
| 2002/0138235 A1 | 9/2002 | Edwards et al. |
| 2003/0127067 A1 | 7/2003 | Karnes |
| 2003/0191877 A1* | 10/2003 | Zaudtke ............ G06F 11/0709 710/72 |
| 2006/0248407 A1* | 11/2006 | Adams, Jr. ......... H04L 12/2697 714/43 |
| 2008/0042830 A1 | 2/2008 | Chakraborty et al. |
| 2008/0081608 A1 | 4/2008 | Findikli et al. |
| 2008/0300009 A1 | 12/2008 | Quinn et al. |
| 2009/0279673 A1* | 11/2009 | Maffre ............... H04L 12/2697 379/1.03 |
| 2010/0042571 A1 | 2/2010 | Dobbins et al. |
| 2010/0178868 A1 | 7/2010 | Charrat |
| 2010/0277866 A1 | 11/2010 | Chen |
| 2011/0312272 A1 | 12/2011 | Goto et al. |
| 2012/0261479 A1 | 10/2012 | Moore et al. |
| 2012/0289155 A1 | 11/2012 | Dua |
| 2012/0290886 A1 | 11/2012 | Wilson, Jr. |
| 2012/0309302 A1 | 12/2012 | Buhot |
| 2012/0315848 A1* | 12/2012 | Smith .................. H04B 5/02 455/41.1 |
| 2013/0124346 A1 | 5/2013 | Baldwin et al. |
| 2013/0179558 A1 | 7/2013 | Lin et al. |
| 2013/0215467 A1 | 8/2013 | Fein et al. |
| 2013/0252543 A1 | 9/2013 | Badi et al. |
| 2013/0332363 A1* | 12/2013 | Renard ............. G06Q 20/3278 705/44 |
| 2014/0045426 A1* | 2/2014 | Cho .................... H04B 5/0031 455/41.1 |
| 2014/0074346 A1 | 3/2014 | Chiaverini |
| 2014/0074537 A1* | 3/2014 | Bargetzi ................ G08C 17/02 705/7.19 |
| 2014/0107886 A1 | 4/2014 | Miljkovic et al. |
| 2014/0154979 A1* | 6/2014 | Tomas ................. G06F 9/4403 455/41.1 |
| 2014/0235162 A1 | 8/2014 | Gallo et al. |
| 2014/0256251 A1 | 9/2014 | Caceres et al. |
| 2014/0329467 A1 | 11/2014 | Ewing et al. |
| 2015/0017911 A1 | 1/2015 | Liu |
| 2015/0046748 A1 | 2/2015 | Uchida |
| 2015/0081538 A1* | 3/2015 | Renard ............. G06Q 20/3278 705/41 |
| 2015/0089221 A1 | 3/2015 | Taylor et al. |
| 2015/0140986 A1 | 5/2015 | Lamb et al. |
| 2015/0149320 A1* | 5/2015 | Smirin .................. G06Q 20/14 705/26.8 |
| 2015/0186871 A1* | 7/2015 | Laracey ............. G06Q 20/3278 705/41 |
| 2015/0222663 A1 | 8/2015 | Patange et al. |

\* cited by examiner

SERVER INFORMATION HANDLING SYSTEM NFC MANAGEMENT SIDEBAND FEEDBACK

CONTINUING DATA

This application is a continuation-in-part of U.S. patent application Ser. No. 14/294,479, filed Jun. 3, 2014, entitled "Server Information Handling System NFC Ticket Management and Fault Storage," by Kevin D. Terwilliger, Travis E. Taylor, Syed S. Ahmed, and John R. Palmer, which is a continuation-in-part of U.S. patent application Ser. No. 14/259,574, filed Apr. 23, 2014, entitled "NFC Communication with an Information Handling System Supplemented by a Management Controller and Advertised Virtual Tag Memory," by Shawn Dube and Syed S Ahmed, which includes exemplary systems and methods and is incorporated by reference in its entirety.

CROSS REFERENCE TO RELATED APPLICATION

U.S. patent application Ser. No. 14/294,487, filed Jun. 3, 2014, entitled "Server Information Handling System NFC Ticket Management and Fault Storage" by inventors Kevin D. Terwilliger, Travis E. Taylor, Syed S. Ahmed, and John R. Palmer, describes exemplary methods and systems and is incorporated by reference in its entirety.

BACKGROUND OF THE INVENTION

Field of the Invention

The present invention relates in general to the field of server information handling system management, and more particularly to a server information handling system NFC management sideband feedback.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server information handling systems are typically centrally located in a data center that has specialized infrastructure to provide networking, power and cooling resources. Often, plural server information handling systems are stacked in racks that have plural slots to provide infrastructure interfaces. For example, a typical server rack includes multiple power supplies and a communication switch that each supports server information handling systems installed in slots of the rack. Racks are disposed in a room having a controlled environment, such as with cooling air vented near each rack. The server information handling systems typically include a baseboard management controller (BMC) that allows remote support operations, such as network-based power-up, power-down, component monitoring, firmware updates and other management operations. Generally, BMC's communicate with administrative tools through an out-of-band management network that is separate from the networks that the server information handling systems functionally serve. For instance, a server information handling system serves client requests responsive to enterprise functions performed over the Internet through a primary network interface and is managed by administrative network tools through a secondary management network.

In modern cloud networking configurations, physical server information handling systems provide physical processing resources that support virtual processing devices, such as virtual machines. As a result, in a given data center, a physical mapping of enterprise functions to the physical machine performing the enterprise functions is often not immediately available and frequently changing. In effect, the physical maintenance of server information handling systems is separate from the maintenance of virtual machines that run over the physical systems. As a physical server information handling system runs into difficulty executing an enterprise function, such as due to processing load or failure of components, the enterprise function virtual machine migrates to different physical resources. Although cloud networking helps to achieve efficient use of processing resources, it does tend to increase the difficulty of identifying and addressing physical processing resource failures and maintenance since there is little available direct relationship between difficulties in performing processing functions and difficulties with underlying physical processing resources.

One advantage of cloud computing and other virtualized networking techniques is that server information handling systems become black boxes that can fit into server racks as needed to replace broken server systems or to expand processing capabilities available for virtual systems. Information technology administrators often work on data center floors to address physical resource maintenance and replacement independent of functional resources running over the information handling systems. Once a server information handling system is repaired or replaced at a rack slot, the information technology administrator powers the server up and configures the server to interact with the management and functional network resources. After the server information handling system is under the control of administrative tools through the management network, remote management controls are typically effective to return the server information handling system into the pool of functional resources.

One difficulty with maintenance and replacement of server information handling systems is that information technology administrators must correctly identify server information handling systems in the data center that have faults and need replacement or maintenance. Typically, information technology administrators in a data center will move a "crash" cart between server racks to investigate issues indicated locally by LED lights or small LED panels, or indicated remotely by communications from BMCs to administration tools. Once issues are spotted, the information technology administrator will typically interface to the BMC locally with a USB or other cable interface in order to retrieve detailed information regarding the fault and determine an appropriate corrective action. Generally, the information technology administrator fills out a trouble ticket based upon the indicated fault and submits the trouble ticket to an administrative tool to schedule maintenance, such as replacement of failed components or of the server information handling system. One difficulty with tracking failures by trouble tickets is that complicated identification information and error codes can sometimes lead to errors at the input of trouble ticket information. Another difficulty that sometimes arises is that a dead server information handling system is unavailable to provide information at the data center floor related to the failure. For example, a complete failure of a server information handling system and its BMC is typically analyzed by removal of the server information handling system for post mortem outside of the data center room.

Once a trouble ticket is submitted, service is authorized and performed by the technician who found the difficulty or by another technician by issuing a service ticket. The technician performs the maintenance and then submits the service ticket as complete so the server information handling system may be brought back on line. Often, some delay is involved in the reboot of the server information handling system after the service ticket is reported as complete. The technician typically has to decide whether to wait until the information handling system powers up or leave and come back later to check on the system. A repair or maintenance operation could have several outcomes: the issue is fixed and the server information handling system comes back online normally; the repair or maintenance did not fix the issue and the server information handling system fails to come back online; the repair or maintenance operation resulted in new issues that impact or impair the information handling system. If the technician waits to see the outcome of the maintenance operation on the server information handling system, then the technician tends to have dead time that could be used to address other data center issues. In other instances, a technician performs standard maintenance at server information handling systems independent of a service ticket, such as firmware or other updates. In some instances, maintenance updates take some time to execute and involve a reboot of the server information handling system. If a repair or maintenance fails to correct operation of the server information handling system and the technician has left the area, then the technician typically has to return to perform additional repairs. The notifications between data center administrators and the scheduling of work often lead to delays in coordinating repair services, which results in unnecessary system down time. In some instances, if a server information handling system fails to communicate correctly with data administrators, an extended delay may result if the technician has left the area since the administrator will have to rely upon the lack of communication as notice of the failure.

SUMMARY OF THE INVENTION

Therefore a need has arisen for a system and method which supports automated issue identification, tracking and resolution proximate a server information handling system housing.

A further need exists for a system and method that provides fault information of a server information handling system in the event of power failure.

A further need exists for a system and method that provides notifications from a server information handling system to a mobile device regarding the state of issue resolution at the server information handling system.

In accordance with the present invention, a system and method are provided which substantially reduce the disadvantages and problems associated with previous methods and systems for server information handling system management and/or maintenance. An NFC device interfaced with a server information handling system management controller provides fault codes detected by the management controller to a portable information handling system, such as a mobile telephone, for automated generation of trouble tickets to report the fault. Faults are maintained for access by the NFC device even in the event of power failure by a backup battery that powers memory storing the fault codes that is interfaced with the NFC device. The management controller determines contact information for portable information handling system through the NFC device to allow the management controller to contact the portable information handling system upon performance of maintenance done through NFC communications.

More specifically, plural server information handling systems deployed in proximity to each other, such as in a common rack or data center, each have an NFC device interfaced with a management controller, such as a baseboard management controller, that detects and reports faults associated with the server information handling system. As faults are detected, the BMC logs the faults in memory accessible by the NFC device. An information technology administrator obtains the faults by an NFC transaction to the NFC device with a portable information handling system, such as a smartphone. If the fault results in power failure, a backup battery maintains the fault information in memory. An application running on the smartphone automatically completes a trouble ticket form with the information provided by the NFC transaction and reports the trouble ticket to an administrative tool. The administrative tool issues service tickets that direct corrective actions coordinated by NFC transactions. For example, a service ticket issued to a smartphone directs an information technology administrator to repair the server information handling system with a selected part. NFC transactions between the selected part, the server information handling system and the smartphone ensure that the correct part is placed in the correct server information handling system with the correct configuration information. If a server information handling system replacement is specified in a service ticket, then a removable bezel that integrates the NFC device is removed from the failed server and placed on the replacement server to aid in the transfer of configuration information stored in tag memory of the NFC device. Unique identifiers of the server information handling systems are referenced to ensure that configuration information on a bezel does not transfer to an incorrect server. If a bezel is placed on a server that does not match a unique identifier stored in the bezel's NFC device, then the NFC tag is wiped clean. The BMC NFC device gathers contact information from a portable information handling system during communications related to the service ticket, such as a phone number or email address. Once a repair is performed, the BMC applies the contact information to communicate directly with the portable information handling system so that the status of the repair is reported through a sideband communication to the technician that performed the repair or a predetermined back-up technician or back-up group.

The present invention provides a number of important technical advantages. One example of an important technical advantage is that an information technology administrator is able to obtain management information when proximate a server information handling system housing by an NFC transaction to a portable information handling system, such as a smartphone. Configuration and identification information of the server information handling system along with fault codes are automatically passed by NFC transaction to a portable information handling system so that trouble tickets are quickly and accurately generated. Further, fault codes are maintained in RAM with a standby battery so that NFC transactions include the final available fault codes detected at system power failure. An information technology administrator who reads fault codes from a failed system may sometimes be able to take corrective action on the installed system without performing a replacement, thus reducing disruptions to data center operations. NFC capabilities on a BMC and also replaceable components helps to ensure that authentic and authorized repair components are installed in response to a trouble ticket, thus reducing the risk that corrective actions will result in additional maintenance issues. For example, a service ticket generated in response to a trouble ticket embeds credentials based upon the NFC transaction that generated the trouble ticket so that the correct server information handling system is serviced with the correct replacement components by the correct technician. In one embodiment, the NFC device is included in a bezel that selectively attaches to a server information handling system so that configuration information remains with a bezel when the bezel is removed from a server information handling system. The bezel NFC erases configuration information if an identifier of a server information handling to which the bezel attaches changes to an unexpected value, thus limiting the risk that incorrect configuration information will be applied to a server information handling system. Another technical advantage is that a technician who performs work on a server information handling system gets direct communications from the server information handling system regarding the status of the work based upon contact information garnered during NFC communications responsive to a service ticket. The technician is rapidly informed of difficulties that arise so that the difficulties may be directly addressed by someone in the area and familiar with the problem and the repair.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An NFC device disposed in a server information handling system or its bezel provides automated sideband feedback to a portable device that performs repairs or maintenance at the server information handling system based upon contact information obtained during an NFC transaction that performs the repair or maintenance. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
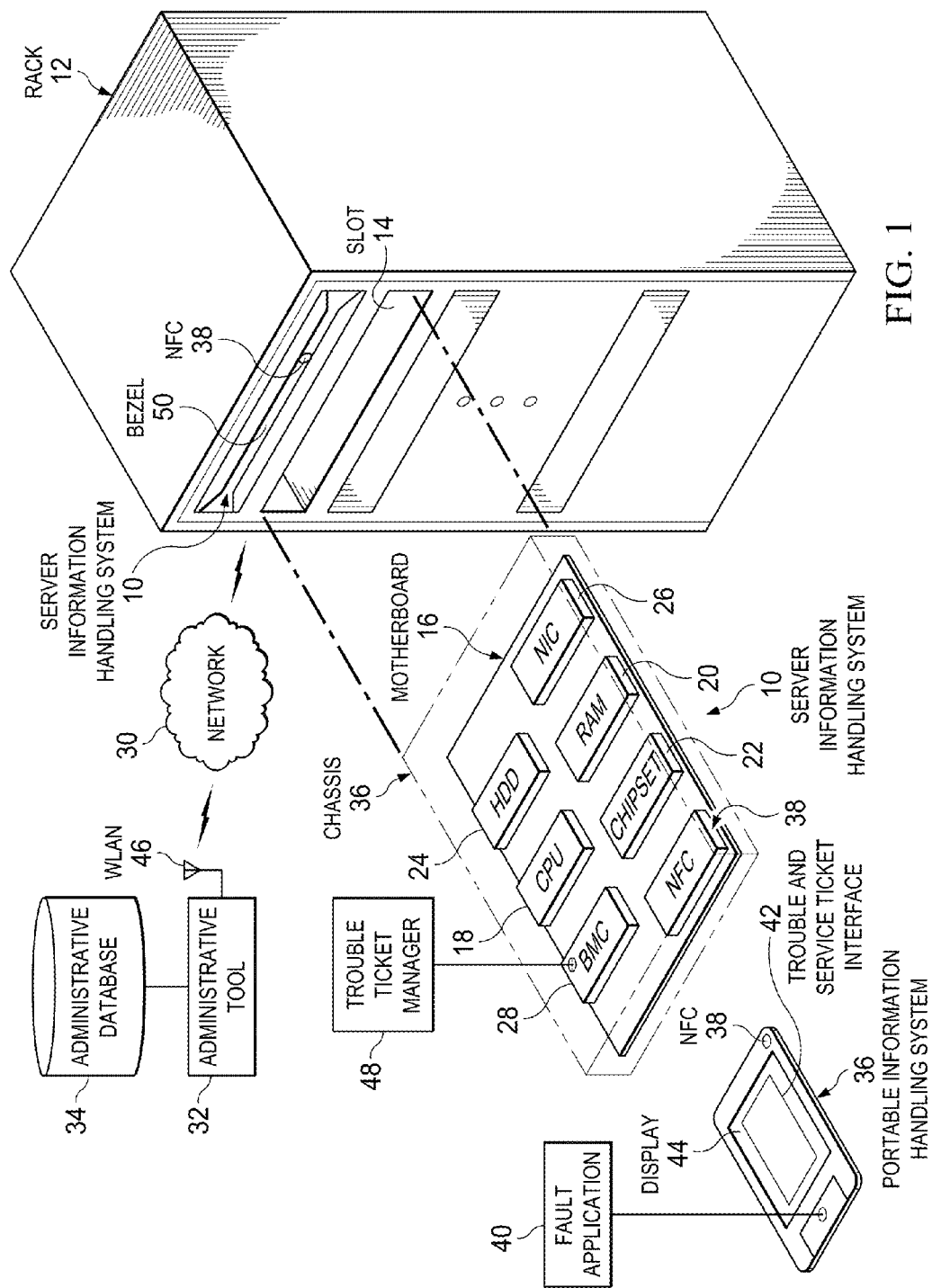
FIG. 1 depicts a block diagram of a system for automated trouble ticket reporting at a server information handling system with an NFC transaction.

Referring now to FIG. 1, a block diagram depicts a system for automated trouble ticket reporting at a server information handling system 10 with an NFC transaction. Information handling systems 10 depicted by the example embodiment of FIG. 1 are co-located in a common rack 12 with each server information handling system 10 inserted in a slot 14 that provides power, cooling and wired networking infrastructure. Each server information handling system 10 processes information with components disposed on a motherboard 16, such as one or more central processing units (CPUs) 18 that executes instructions, random access memory (RAM) 20 that stores instructions and information, a chipset 22 that includes firmware to coordinate actions between the processing components, a hard disk drive (HDD) 24 that provides persistent storage, and one or more network interface cards (NICs) 26 that communicate with a wired network, such as Ethernet. Server information handling system 10 includes a management controller, such as a baseboard management controller (BMC) 28, which provides remote management functions through a network 30. For example, BMC 28 allows an administrative tool 32 to perform remote power up and power down as well as to perform maintenance, such as software and firmware patches. Administrative tool 32 tracks server hardware, software and security information with an administrative database 34.

During normal operations, plural racks disposed in a data center each have plural server information handlings 10 that process client requests through network 30, such as the Internet. Operations of the server information handling systems 10 are monitored by BMC's 28 for faults, such as failed components, reduced performance, thermal constraints and power consumption. If a server information handling system 10 fails or has a fault, a report is made to administrative tool 32 so that an information technology administrator can take corrective action, such as with remote commands through BMC 28 or through physical interactions with the server information handling system 10 on the datacenter floor. Server information handling systems also typically include visual indicators of faults that are managed by BMC 28, such as set of LEDs or a small display integrated with a chassis 36 that supports components of the server information handling system 10. In a typical scenario, an information technology administrator in a data center has a trouble cart with tools and spare components to address failures in a prompt manner as the failures arise. The trouble cart may travel to racks 12 and server information handling systems 10 based upon instructions sent from administrative tool 32 or may locate difficulties based upon visual indicators at a server information handling system 10, such as flashing LEDs. Once a server information handling system 10 is located with one or more faults, the information technology administrator fills out a "trouble ticket" to report the fault to the administrative tool 32. Authorization to take actions in response to a trouble ticket is then provided with a "service ticket" from administrative tool 32, such as an authorization to replace the server information handling system 10 or faulty components in the server information handling system 10.

In order to simplify the completion of trouble tickets and responses to service tickets, a mobile telephone information handling system 36 (or other portable information handling system, such as a tablet or laptop) interacts through NFC transactions supported by NFC devices 38 to manage server information handling systems 10, such as managing maintenance, updates, repairs and replacements. In alternative embodiments, alternative wireless communication protocols may be used, such as Bluetooth. Mobile telephone information handling system 36 executes a fault application 40 to present a trouble and service ticket interface 42 at a display 44. An information technology administrator carries mobile telephone information handling system 36 in the data center and responds to fault indications provided by administrative tool 32 or by visual indicators, such as LED indications of faults. Once the information technology administrator reaches the proximity of the server information handling system 10, placing NFC device 38 of mobile telephone information handling system 36 proximate NFC device 38 of server information handling system 10 results in an NFC transaction that passes fault information detected by BMC 28 to mobile telephone information handling system 36. Mobile information handling system 36 also passes key unique identification parameters such as IMEI, phone number, user email or other contact information to the BMC 28 so that BMC 28 can use this information to provide feedback to the mobile device. For instance, a trouble ticket manager 48 passes fault codes detected by BMC 28 along with identification information of the server information handling system to fault application 40 of mobile telephone 36. Fault application 40 accepts the fault information and automatically fills out a trouble ticket to report the fault to administrative tool 32. Since all of the information needed to complete the trouble ticket is passed by the NFC transaction, the trouble ticket is prepared and presented at trouble and service ticket interface 42 without end user inputs. Once a trouble ticket is prepared, the information technology administrator is able to edit the trouble ticket if necessary and then send the trouble ticket to administrative tool 32.

Administrative tool 32 applies the trouble ticket to generate a service ticket that provides the information technology administrator with authorization and instructions for repairing or replacing the server information handling system. For example, if a fault code indicates that a particular component has failed, the service ticket identifies a replacement component for use to replace the failed component, such as replacement located on the crash cart of the information technology administrator assigned to fix the server information handling system. Alternatively, if the server information handling system has failed to a point that the entire system needs replacement, the service ticket identifies a replacement server information handling system 10, such as by a unique service identifier stored in the BMC of the replacement system. Administrative tool 32 sends the service ticket through a wireless local area network (WLAN) 46 or a mobile telephone wireless wide area network (WWAN) to the mobile telephone information handling system 36 of the information technology administrator assigned to address the fault. The components addressed by the service ticket are stored in administrative database 34 to provide precise tracking by unique identifier of each server information handling system 10 and each component in the datacenter. Since unique identifiers are automatically loaded into trouble and service tickets, inadvertent errors due to typographical inputs are avoided.

When an information technology administrator approaches a server information handling system 10 to address a service ticket, NFC transactions between the server information handling system 10, replacement components and mobile telephone information handling system 36 help to ensure that the correct repairs are performed. For example, if a hard disk drive is prescribed by the service ticket, an NFC transaction between the hard disk drive and the mobile telephone ensures that the replacement component used by the information technology administrator matches that of the service ticket. Once the fault application obtains the replacement components information, another NFC transaction between mobile telephone 36 and a server information handling system 10 allows transfer of the replacement component information to the server information handling system. As another example, an NFC transaction between the server information handling system 10 BMC 28 NFC 38 and the replacement hard disk drive allows BMC 28 to confirm the correct component and prepare configuration of the new hard disk drive. Similarly, an NFC transaction between the BMC 28 NFC device 38 and the failed hard disk drive allows BMC 28 to confirm that the correct hard disk drive was removed by the information technology administrator. As repairs are completed at a server information handling system 10, administrative tool 32 updates administrative database 34 to reflect the changed system configurations as confirmed by NFC transactions and BMC communications through network 30.

Figure 2:
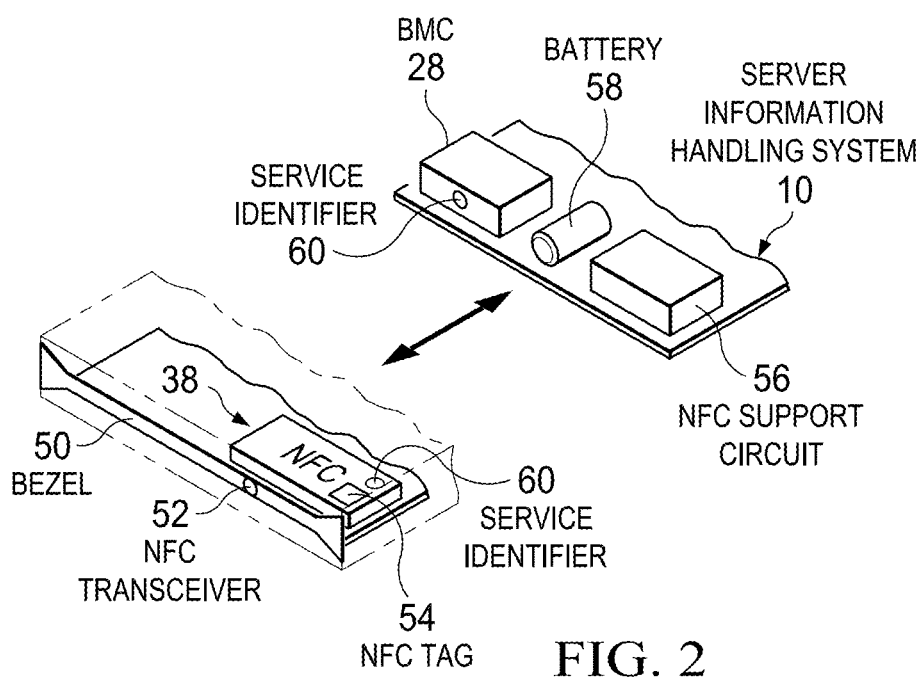
FIG. 2 depicts a system for NFC transactions of server information handling system failure codes at power failure.

Referring now to FIG. 2, a system is depicted for NFC transactions of server information handling system 10 failure codes at power failure. A bezel 50 removably couples to server information handling system 10 so that an information technology administrator is able to completely detach bezel 50 and re-attach bezel 50. NFC device 38 is integrated with bezel 50, including an NFC transceiver 52 that performs NFC transactions from and NFC tag memory 54. NFC device 38 when detached from server information handling system 10 supports NFC transactions without power by using a requesting device's RF energy to transmit information stored in persistent flash memory of NFC tag memory 54. NFC device 38 interfaces with an NFC support circuit 56 that is integrated with server information handling system 10. For example, NFC support circuit 56 is a microcontroller that integrates RAM and flash memory as disclosed in greater detail in U.S. patent application Ser. No. 14/259,574, entitled "NFC Communication with an Information Handling System Supplemented by a Management Controller and Advertised virtual Tag Memory," by Shawn Dube and Syed S Ahmed, filed Apr. 23, 2014, which is incorporated herein by reference as if fully set forth. For example, NFC device 38 and NFC support circuit 56 communicate through a serial interface that snaps into place when bezel 50 couples to server information handling system 10. NFC support circuit interfaces with BMC 28 to receive fault information and provide enhanced NFC transactions, such as with a virtual tag memory supported by RAM integrated within NFC support circuit 56. During normal operations, NFC support circuit 56 is power under management of BMC 28, however, if BMC 28 does not have power, then a back-up battery 58 provides power to NFC support circuit 56 so that it may continue to support NFC device 38.

One advantage of removable bezel 50 is that configuration information for server information handling system 10 is stored locally in persistent NFC tag memory 54 to allow more rapid and accurate configuration of replacement server information handling system. For example, if a service ticket calls for replacement of a server information handling system 10, the information technology administrator removes bezel 50 from the installed server information handling system and places bezel 50 on the replacement server information handling system. When the replacement server information handling system 10 powers up, its BMC 28 queries NFC support circuit 56 to find configuration information, if any, stored in NFC tag memory 54. If NFC tag memory 54 includes configuration information, then BMC 28 applies the configuration information to configure server information handling system 10. Storage in bezel 50 of configuration information, such as network addresses, boot order, etc . . . , allows an information technology administrator to coordinate configuration of server information handling systems 10 interacting with a network before bezels 50 are installed, thus reducing the time spent in a datacenter deploying new or repaired systems. In order to confirm that a bezel 50 is connected with an intended server information handing system 10, a unique identifier, such as service identifier 60, is stored with the configuration information. If BMC 28 retrieves configuration information from NFC device 38, then BMC compares the service identifier 60 retrieved with the configuration information to the BMC's own service identifier to confirm that the bezel is intended to couple to server information handling system 10. In one embodiment, NFC support circuit 56 compares the service identifier 60 stored in NFC tag memory 54 with the service identifier 60 of BMC 28 and erases the configuration information if the service identifiers 60 do not match. If a replacement server information handling system 10 is installed and intended to accept the stored configuration information, then an NFC transaction from mobile d 36 provides the replacement service identifier 60 to the NFC tag so that a transfer of existing configuration information is permitted.

On advantage of back-up battery 58 that powers NFC support circuit 56 is that fault information is stored for access by NFC transactions even after failure of a server information handling system 10. For example, if power fails at server information handling system 10, then pre-failure logic of BMC 28, such as logic running on reserve capacitance of the BMC circuit board, automatically saves all existing fault codes to memory of NFC support circuit 56. When an information technology administrator approaches the failed server information handling system 10, he is able to retrieve fault codes with an NFC transaction that accesses NFC support circuit 56 memory powered by back-up battery 58. Advantageously, NFC transaction access to fault codes after power failure at server information handling system 10 allows the information technology administrator to analyze a failure and, if possible, repair server information handling system 10 while still installed in the datacenter. Thus, a minor failure that results in power down, such as a cooling fan or power supply failure, is repaired without the inconvenience and cost associated with removal and replacement of the server information handling system.

Figure 3:
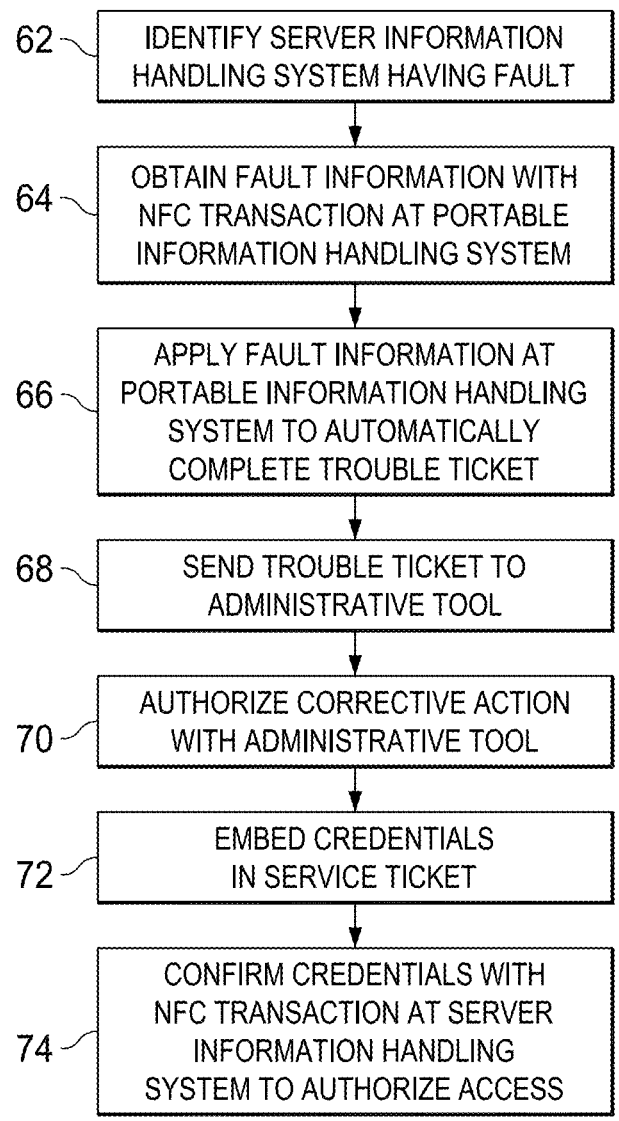
FIG. 3 depicts a flow diagram of a process for automated generation of a server information handling system trouble ticket with an NFC transaction.

Referring now to FIG. 3, a flow diagram depicts a process for automated generation of a server information handling system trouble ticket with an NFC transaction. The process begins at step 62 with identification of the server information handling system having the fault, such as with a BMC notification to an administrative tool or a visual indication with LEDs seen by an information technology administrator on a datacenter floor. At step 64, fault information, such as fault codes, are obtained from the server information handling system with an NFC transaction to a portable information handling system held by an information technology administrator proximate to the server information handling system. At step 66, the fault information obtained through the NFC transaction is applied at the portable information handling system, such as mobile telephone, to automatically complete a trouble ticket on the portable information handling system. In one example embodiment, an application running on the portable information handling system requests information by NFC transaction that is needed to fill out the trouble ticket. In another example embodiment, instructions running on the BMC or NFC support circuit have fields for the trouble ticket pre-completed and ready to download upon request by an NFC transaction. In yet another example embodiment, the NFC transaction instructs the BMC to automatically generate a trouble ticket from the pre-completed fields and to send the trouble ticket through the BMC management network to the administrative tool. In alternative embodiments, alternative instructions may be used to apply the fault codes and other server information to complete an appropriate trouble ticket.

At step 68, the trouble ticket with the fault information and identifier for the associated server information handling system 10 is sent to an administrative tool. At step 70, corrective action in response to the fault code is authorized at the administrative tool, such as replacement of a failed component or server information handling system with a replacement component or server information handling system. Authorization of correction action may include specific actions and predetermined components that the corrective action must include so that the repair has a reduced risk of causing problems in the operation of the datacenter. At step 72, credentials for performing the authorized repair are embedded in a service ticket and the service ticket is dispatched to initiate the corrective action. By issuing a service ticket with credentials, such as an encrypted passcode also sent to the BMC that identifies the individual performing the repairs, access to the server information handling system is selectively restricted, such as with a bezel lock controlled by the BMC. At step 74, the credentials are confirmed at the server information handling system with an NFC transaction from a portable information handling system, such as smartphone. In one example embodiment, the credentials are based upon a user name and password of an information technology administrator assigned to perform the service. In another embodiment, the credentials include a unique identifier for the server information handling system under repair and for each of the components authorized for use in the repair. Should a repair take place that differs from that authorized by the service ticket, the administrative tool is notified and the service ticket maintained open until the repair is completed as defined.

Figure 4:
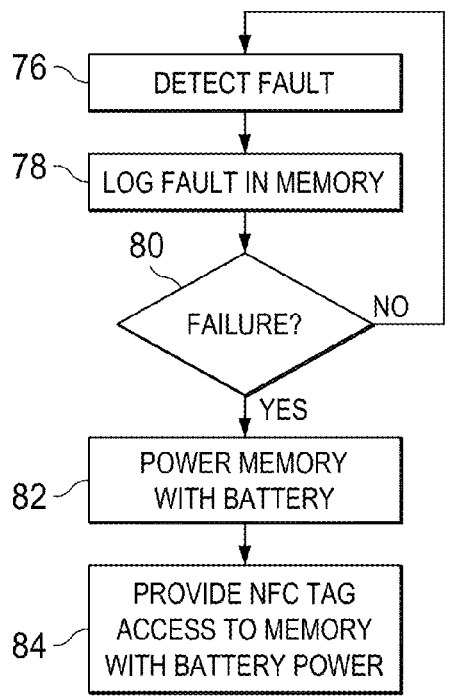
FIG. 4 depicts a flow diagram of a process for providing server information handling system fault codes in the event of a power failure.

Referring now to FIG. 4, a flow diagram depicts a process for providing server information handling system fault codes in the event of a power failure. The process begins at step 76 with detection of a fault at the server information handling system, such as with logic running on a BMC. At step 78, the detected fault is logged as a fault code in memory of the NFC support circuit, such as by communicating fault codes as the codes are detected to RAM in a microcontroller disposed between the BMC and NFC device. At step 80, a determination is made of whether the fault has resulted in a failure of the server information handling system, such as a power failure that causes the BMC to power down. If not, then the process returns to step 76 to continue monitoring of the fault codes as the fault codes are detected. If a failure causes a power down at step 80, the process continues to step 82 at which the memory of the NFC support circuit that stores fault codes is powered by the backup battery. At step 84, the backup power provides NFC tag access to the fault codes in the NFC support circuit memory. An end user is thus able to retrieve fault codes from a completely dead server information handling system by an NFC transaction supported with the backup battery. In one alternative embodiment, the backup battery provides power to write the fault codes into persistent memory of the NFC tag so that the fault codes remain available even after the backup battery charge is expended.

Figure 5:
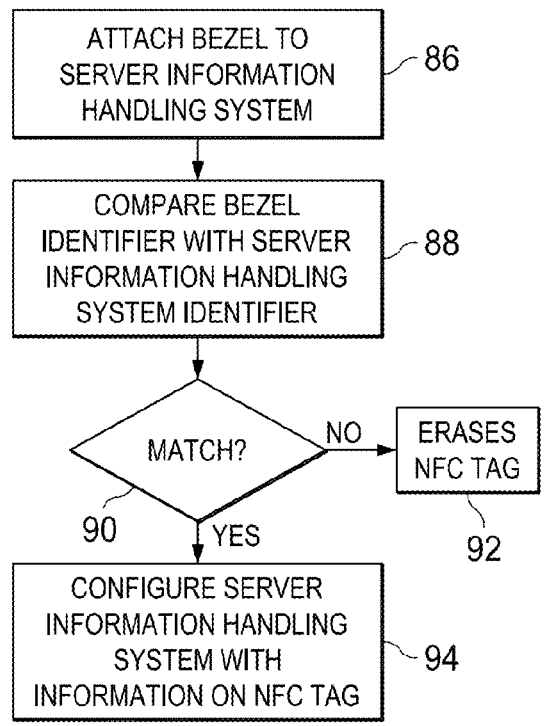
FIG. 5 depicts a flow diagram of a process for transferring configuration information with a server information handling system bezel having an integrated NFC device.

Referring now to FIG. 5, a flow diagram depicts a process for transferring configuration information with a server information handling system bezel having an integrated NFC device. The process starts at step 86 by attaching the bezel to the server information handling system so that the integrated NFC device communicates with the BMC, such as through a serial interface. At step 88, a comparison is performed of the server information handling system unique identifiers stored on the BMC and in the NFC device integrated in the bezel. The comparison may be performed at the bezel with logic associated with the NFC device, at an NFC support circuit disposed between the BMC and NFC device or at the BMC. At step 90, a determination is made of whether the unique identifier stored on the NFC device, such as in the tag memory, matches a unique identifier of the server or servers allowed to couple with the bezel. If the unique identifiers do not match, the process continues the step 92 to erase information stored in the tag memory of the NFC device. By erasing the tag memory where the bezel and information handling system unique identifiers do not match, assurance is provided that configuration information stored in the tag memory will not be applied to an unintended server information handling system. If the unique identifiers match at step 90, the process continues to step 94 to configure the information handling system with configuration information stored in the tag memory. In one example embodiment, a bezel removed from a failed server information handling system has the unique identifier of a replacement server information handling system stored in its tag memory by an NFC transaction so that the bezel provides the configuration information of the failed system to the replacement system when the bezel is placed on the replacement system.

Figure 6:
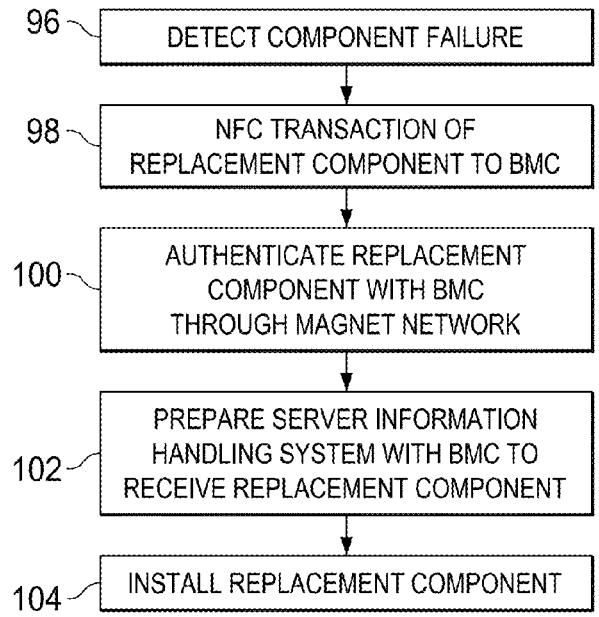
FIG. 6 depicts a flow diagram of a process for authentication or a replacement component at a server information handling system BMC with an NFC transaction from the replacement component to the BMC.

Referring now to FIG. 6, a flow diagram depicts a process for authentication of a replacement component at a server information handling system BMC with an NFC transaction from the replacement component to the BMC. The process starts at step 96 with detection of a components failure, such as by a BMC monitoring server operations or an information technology administrator walking datacenter to observe LED indicators. At step 98, an NFC transaction is accomplished between an NFC device of the replacement component and a server information handling system BMC to provide the BMC with an identifier and configuration information for the replacement component, such as drivers to incorporate the replacement component into the server. In one embodiment, the replacement component is selected in a service ticket provide from an administrative tool. At step 100, the replacement component is authenticated with a server BMC by comparing the information received by the NFC transaction with expected information. For example, the BMC compares an identifier of the replacement component with an identifier indicated by a service ticket to ensure that the replacement component is the correct part. As another example, the BMC compares the type of replacement component with permissible types of components to ensure that the replacement component is compatible with the server information handling system. At step 102, the BMC prepares the server information handling system to accept the replacement component, such as by loading any necessary drivers or adjusting any configuration settings at the server based upon the information received by the NFC transaction. At step 104, the replacement component is installed in the server information handling system and supported by the BMC based upon the information provided from the replacement component to the BMC by the NFC transaction. In one embodiment, physical access to the server information handling system is restricted until installation is authorized by the BMC based upon the NFC transaction from the replacement component to the BMC.

Figure 7:
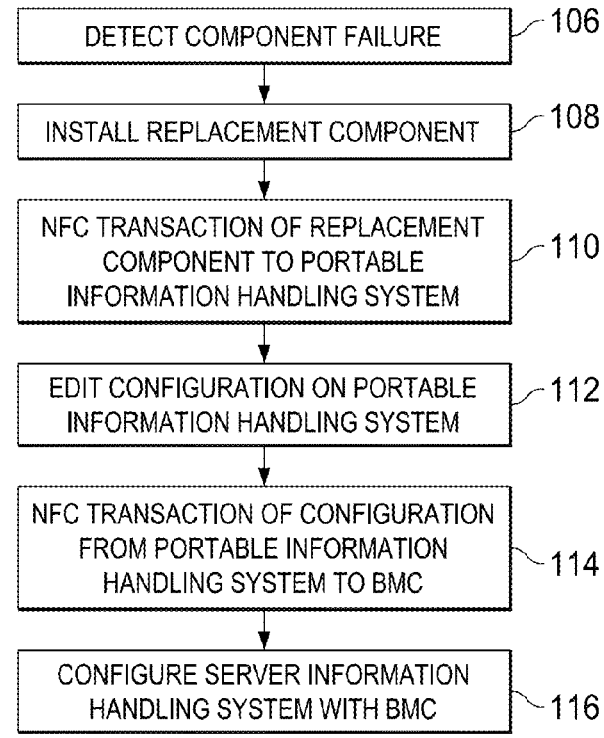
FIG. 7 depicts a flow diagram of a process for configuration of a replacement component with NFC transactions through a mobile telephone.

Referring now to FIG. 7, a flow diagram depicts a process for configuration of a replacement component with NFC transactions through a mobile telephone. The process starts at step 106 with detection of a component failure at a server information handling system. At step 108, a replacement component for the failed component is installed in the server information handling system. At step 110, an NFC transaction is performed from the BMC to the mobile telephone of the replacement component configuration as detected by the BMC. At step 112, the configuration of the replacement component is edited on the mobile telephone to a desired configuration. At step 114, an NFC transaction is performed from the mobile telephone to the BMC with the edited configuration information. At step 116, the server information handling system applies the edited configuration information to configure the replacement component. Advantageously, performing the configuration update in this manner allows completion of the configuration process and verification that the server is operating correctly before the information technology administrator leaves the location of the server information handling system.

Figure 8:
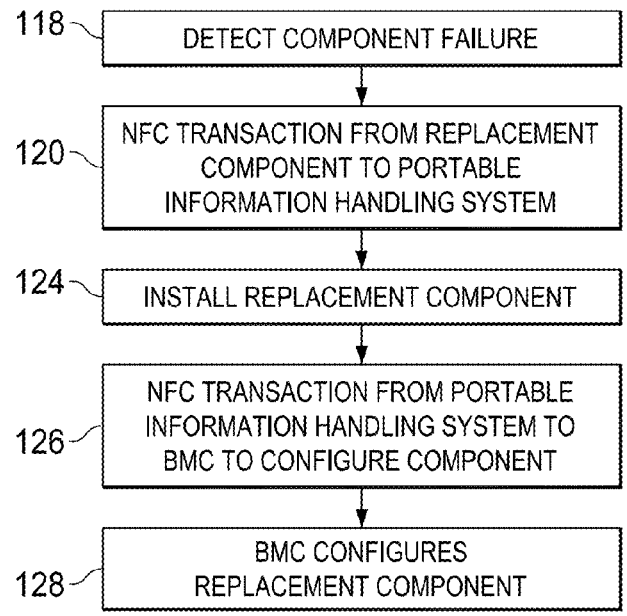
FIG. 8 depicts a flow diagram of a process for configuration of a replacement component by a BMC with NFC transactions through a mobile device.

Referring now to FIG. 8, a flow diagram depicts a process for configuration of a replacement component by a BMC with NFC transactions through a mobile telephone. The process starts at step 118 with detection of a failure at a server information handling system. At step 120, an NFC transaction is performed from the replacement component to a mobile telephone to provide the mobile telephone with configuration information of the replacement component. At step 124, the replacement component is installed in an information handling system. At step 126, an NFC transaction is performed from the mobile telephone to the server BMC to provide the configuration information of the replacement component to the BMC. At step 128, the BMC applies the configuration information to configure the replacement component to interact with the server information handling system.

Figure 9:
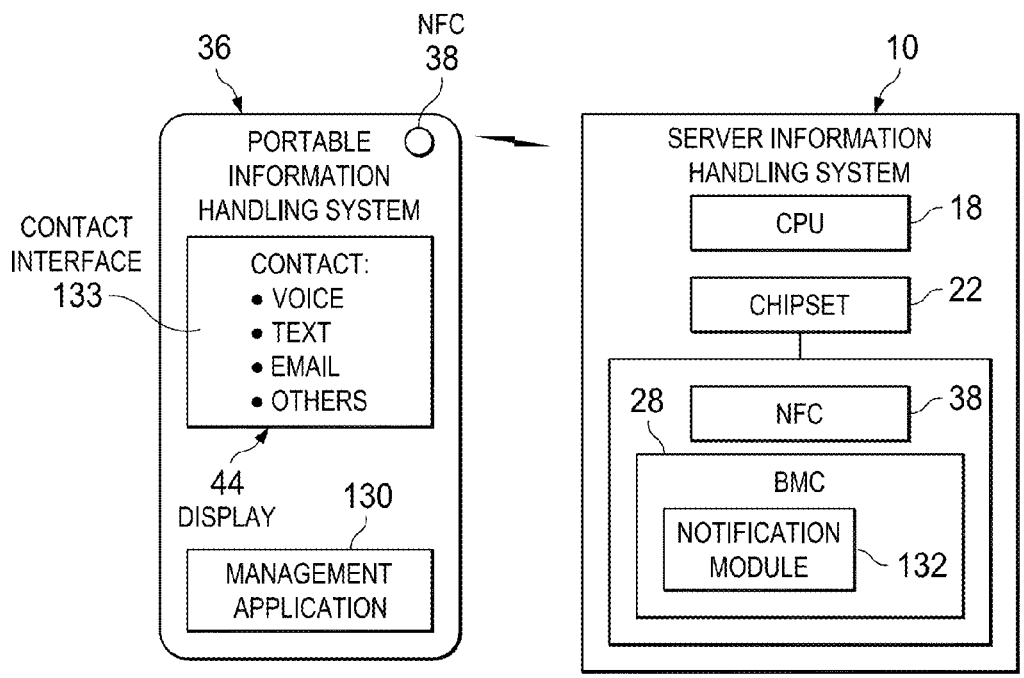
FIG. 9 depicts a block diagram of a server information handling system management controller configured to apply contact information of a portable information handling system received by an NFC transaction to report management function status directly to the portable information handling system.

Referring now to FIG. 9, a block diagram depicts a server information handling system 10 management controller 28 configured to apply contact information of a portable information handling system 36 received by an NFC transaction to report management function status directly to the portable information handling system. Portable information handling system 36, such as a mobile phone, interfaces with BMC 28 by communication between NFC devices 38 to perform management functions for server information handling system 10 as set forth above. For example, an information technology administrator in a data center responds to a service ticket sent by a WLAN to his mobile telephone by interfacing with the BMC 28 of the server information handling system 10 identified by the service ticket. A management application 130 running on portable information handling system 10 has access to communication accounts supported by portable information handling system 10, such as phone number and email contact information. Management application 130 provides the contact information to a notification module 132 running on BMC 28 so that notification module 132 can initiate a contact directly to portable information handling system 36 for predetermined states of management functions initiated by management application 130 or other applications running on portable information handling system 36. In the example embodiment, a contact interface 133 presented at display 44 of portable information handling system 36 allows an end user to select the types of contacts, such as a voice message sent to a phone number, a text message sent to a phone number, an email sent to an email address or other contacts specified by the end user, such as other information technology administrators. The various available contact methods are provided to BMC 28 for utilization during the NFC transaction, or other transaction methods supported with the portable information handling system, such as Bluetooth or even a wired contact, such as USB.

In operation, notification module 132 allows an end user to get direct feedback from BMC 28 for management functions initiated by the end user through the device used by the end user to initiate the management functions. Direct communications initiated by BMC 28 removes the systematic delay experienced by notifications sent through an administrative system, such as a by trouble and service tickets or during other maintenance activities. The user is updated on the status of a system management command directly from the server information handling system 10 with a sideband mechanism that avoids data center management infrastructure. The number of such notifications may be reduced for an administrator by limiting notifications to situations where a management function has failed or otherwise needs attention, while successful management functions are handled by data center infrastructure. Sideband mechanisms may include voice, text or email messages generated by notification module 132 and sent to contact information received during an NFC transaction that commands a management function, and may include push services offered by cloud messaging services, such as Google Cloud Messaging GCM, Pushlet and Urban Airship, which are identified in the contact information provided by the NFC transaction. In addition to notifications based upon contact information provided during the NFC transaction, additional notifications may be generated according to profile settings of the user in a cloud messaging service, an exchange messaging profile or a local OpenManage Essential (OME) profile. Notifications may indicate the management function that failed, the server information handling system involved, the type of failure and the location of the server information handling system, such as with a map of the server information handling system sent with a text or email message.

Figure 10:
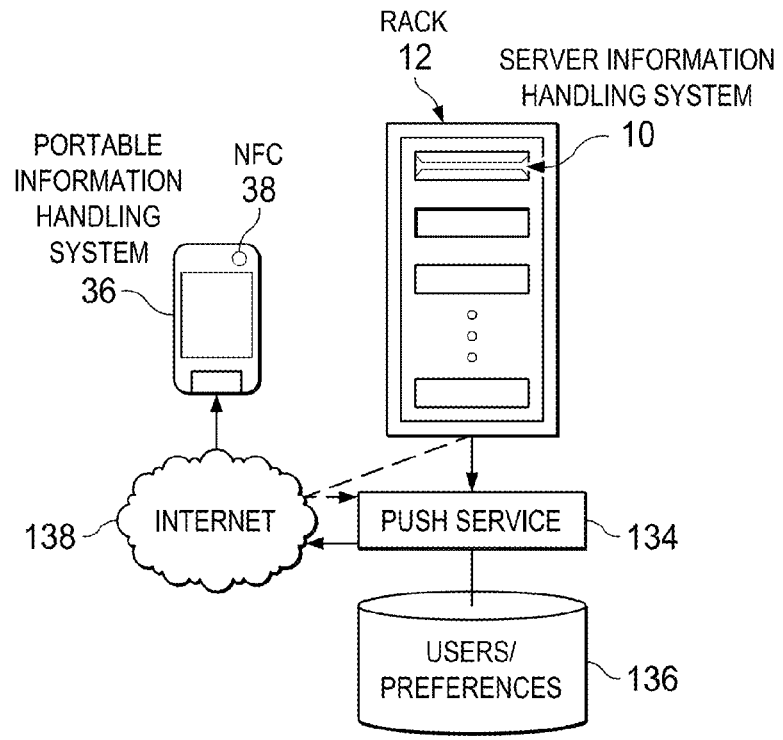
FIG. 10 depicts a block diagram of a sideband notification path for sending management function notifications directly from a management controller to a portable information handling system that initiates the management function by an NFC transaction.

Referring now to FIG. 10, a block diagram depicts a sideband notification path for sending management function notifications directly from a management controller to a portable information handling system 36 that initiates the management function by an NFC transaction. When a predetermined event is detected by a BMC, server information handling system 10 sends a notification to a push service 134, such as through an internal interface or an Internet interface. Push service 134 receives the notification and looks up users and preferences in a database 136 to determine how to manage the notification, such as individuals and contact information associated with the notification. Push service 134 then pushes the notification to the appropriate individuals based upon the type of notification involved and preferences associated with the type of notification. For example, a firmware reflash commanded by an NFC transaction from a portable information handling system 36 fails resulting in generation by BMC 28 of a notification to a phone number provided with the firmware reflash command. In one embodiment, a timer is set to test the success or failure of the firmware reflash after a time period has passed, such as 10 minutes or an hour, so that difficulties that arise after an initially-successful reflash may be detected. Push service 134 receives the notification with the phone number and looks up preferences associated with the telephone number in database 136 or otherwise provided in the NFC transaction. The preferences indicate a text message to the telephone number with an image having a map of the location of the failed system in the data center. The text message is sent to portable information handling system 36 so that the end user can promptly return to server information handling system 10 to address the failure while the end user is still in the area. If the preferences indicate an off-duty time associated with the phone number, the text message may instead be sent to the next shift indicated in the preferences stored in database 136. If the failure is to a critical system, preferences in database 136 may indicate notifications to other individuals so that the failure is promptly addressed.

Figure 11:
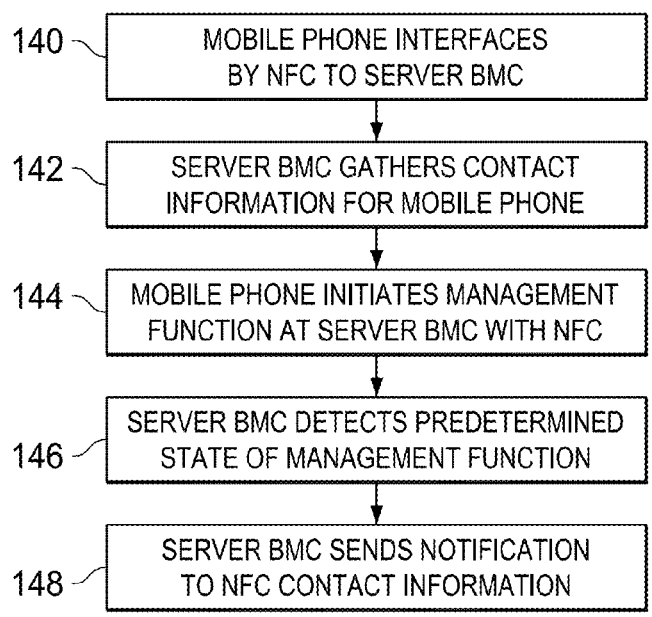
FIG. 11 depicts a flow diagram of a process for a management controller to directly notify a portable information handling system about the status of a management function initiated by the portable information handling system with an NFC transaction.

Referring now to FIG. 11, a flow diagram depicts an NFC transaction process for a management controller to directly notify a portable information handling system about the status of a management function initiated by the portable information handling system with an NFC transaction. The process starts at step 140 with a mobile telephone interface by NFC to a server BMC, such as in response to a service ticket. The NFC interface may include security information that identifies the end user, such as LDAP user name and password authentication. At step 142, the server BMC gathers contact information for the mobile telephone to support notifications by the BMC to the user of the mobile telephone relating to the management performed by the user at the BMC. In one embodiment, the contact information is sent during initial NFC transfers of the management NFC transaction. For instance, contact information is sent during initial setup of the NFC connection as part of a setup handshake. If other types of interfaces are used, such as Bluetooth or wired USB interfaces with the mobile telephone, the contact information may be included in the initial setup of the interfaces in a similar manner to the NFC embodiment described herein. In another embodiment, the BMC requests the contact information if the BMC has notification capability. The contact information may be sent as NFC communications that include a phone number of the mobile phone used to perform the NFC transaction or an email supported by an email account of the mobile phone. Alternatively, contact information may be looked up in association an identifier of the device, such as a MAC or IP address, or an identifier of the end user, such as a user name and password to obtain access to the BMC. The BMC may, for instance, obtain the contact information from an LDAP or other authentication service.

At step 144, the mobile telephone initiates a management function at the server BMC with the NFC transaction. Management functions may include software or firmware upgrades, component replacements and information handling system replacement. In some instances, management functions are set into motion by an NFC transaction and complete over an extended time period, such as a RAID rebuild of a failed hard disk drive. In some instances, management functions are initiated and completed relatively quickly and then monitored for success, such as packet loss in a network interface card. The mobile phone user sets the parameters for monitoring management function success or failure, such as completing an installation step or completing a desired amount of monitoring. At step 146, the server information handling system BMC detects a predetermined state of the management function associated with sending a notification. The predetermined state may be set by the end user at the time of management function initiation or by the BMC as a preference setting. Predetermined states may vary from a successful completion of the management function, such as completion of a raid drive rebuild, or a failure of all or part of a management function, such as a failure of a system that had a firmware reflash to come up after a defined time or a failure of a system to achieve a desired operating parameter. Upon detection of the predetermined state, at step 148 the server information handling system BMC sends a notification to NFC contact information based upon the contact information gathered during the NFC transaction. Once an end user receives the notification, the end user may respond as appropriate, including an immediate return to correct a failure or ignoring the notification as a matter that will eventually be handled by a standard trouble and service ticket process.

Although the present invention has been described in detail, it should be understood that various changes, substitutions and alterations can be made hereto without departing from the spirit and scope of the invention as defined by the appended claims.

What is claimed is:

1. A system for managing a server information handling system, the system comprising:
    a management controller integrated with the server information handling system and operable to perform management functions of the server information handling system;
    a near field communication (NFC) device interfaced with the management controller and operable to support communication of management information between the management controller and an external information handling system with a NFC transaction;
    a portable information handling system external to the server information handling system and operable to communicate with the NFC device by the NFC transaction, the portable information handling system having contact information stored in local memory of the portable information handling system, the contact information supporting communications through a network to the portable information handling system;
    a management application running on the portable information handling system and operable to communicate management information to the management controller with the NFC transaction to command a management function at the server information handling system; and
    a notification module associated with the management controller and the NFC device, the notification module operable to obtain the contact information from the memory of the portable information handling system during the NFC transaction and apply the contact information to send a notification from the management controller to the portable information handling system through the network based upon a predetermined state of the management function at the server information handling system.

2. The system of claim 1 wherein:
    the contact information comprises a telephone number of the portable information handling system; and
    the notification comprises a communication sent by the management controller to the telephone number including the predetermined state.

3. The system of claim 2 wherein the notification further comprises a text message.

4. The system of claim 3 wherein the text message includes an image having a map of the physical location of the server information handling system.

5. The system of claim 2 wherein the notification further comprises a voicemail.

6. The system of claim 1 wherein:
    the contact information comprises an email address of an email account supported by the portable information handling system; and
    the notification comprises an email sent by the management controller to the email address number including the predetermined state.

7. The system of claim 1 wherein the notification module applies the contact information to send the notification through an Internet interface with a push service.

8. The system of claim 1 wherein the management application is further operable to accept a user selection of contact information and to send the user selected contact information in the NFC transaction.

9. The system of claim 8 wherein the user selection of contact information includes contact information for one or more additional portable information handling systems to receive notifications, the contact information for the one or more additional portable information handling systems included with the NFC transaction.

10. A method for managing server information handling systems, the method comprising:

commanding a management function at a server information handling system with an NFC transaction sent by a portable information handling system to a NFC device interfaced with a management controller of the server information handling system, the NFC transaction including contact information of the portable information handling system, the contact information stored in memory locally on the portable information handling system to support network communications with the portable information handling system;

detecting a predetermined state of the management function with the management controller; and in response to detecting, sending a notification directly from the management controller to the portable information handling system with the contact information communicated by the NFC transaction, the notification sent through a network communication with the portable information handling system.

11. The method of claim 10 wherein in response to detecting, sending a notification to the contact information further comprises sending a text to a telephone number of the portable information handling system.

12. The method of claim 10 wherein in response to detecting, sending a notification to the contact information further comprises sending a voice message to a telephone number of the portable information handling system.

13. The method of claim 10 wherein in response to detecting, sending a notification to the contact information further comprises sending an email to an email address of an email account supported by the portable information handling system.

14. The method of claim 13 wherein sending an email further comprises sending an image depicting a physical location of the server information handling system.

15. The method of claim 10 the predetermined state of the management function comprises a failure to complete the management function.

16. The method of claim 10 further comprising:

selecting at the portable information handing system contact information of at least one additional portable information handling system;

including the contact information of the at least one additional portable information handling system with the NFC transaction; and in response to detecting, sending a notification from the management controller to the contact information of the at least one additional portable information handling system.

17. The method of claim 10 wherein in response to detecting, sending a notification from the management controller to the contact information further comprises sending a notification from the management controller through the Internet to a push service, the push service pushing the notification to the portable information handling system.

18. The method of claim 10 further comprising:

completing the management function;

setting a timer at the management controller;

testing the management function after the timer completes; and sending the notification if the testing the management function detects a failure.

19. A server information handling system comprising:

a processor operable to process information with instructions;

non-transitory memory operable to store the information and instructions;

a management controller operable to manage operations of the processor responsive to remote instructions receive through a network;

an NFC device interfaced with the management controller and operable to accept a command to perform a management function by an NFC transaction and to send the command to the management controller for execution; and a notification module comprising instructions stored in the non-transitory memory and executable by the management controller, the notification module associated with the management controller and the NFC device, the notification module operable to obtain contact information from a portable information handling system interfacing through the NFC device, the contact information obtained by an NFC transaction between the portable information handling system and management controller through the NFC device, the contact information supporting a network communication directed to the portable information handling system, and to apply the contact information to send a notification to the portable information handling system using the contact information, the notification sent through a network based upon a predetermined state of the management function at the server information handling system.

20. The server information handling system of claim 19 wherein the notification comprises an email or text message sent directly from the management controller to a contact address, the email or text message including the management function state.

* * * * *